(12) United States Patent
Thomas et al.

(10) Patent No.: US 6,714,588 B1
(45) Date of Patent: Mar. 30, 2004

(54) METHOD AND APPARATUS FOR INTERFERENCE CANCELLATION IN A HIGH SPEED MODEM

(75) Inventors: Robert McLaren Thomas, Nepean (CA); Carl William Anderson, Kanata (CA); Michael Henry Dziawa, Richmond (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/429,495

(22) Filed: Oct. 29, 1999

(30) Foreign Application Priority Data

Nov. 16, 1998 (CA) ................................................ 2254307

(51) Int. Cl.[7] .......................... H04L 5/16; H04L 27/06; H04L 1/00
(52) U.S. Cl. ...................... 375/222; 375/219; 375/316; 375/346
(58) Field of Search .............................. 375/222, 348, 375/349, 346, 347, 350, 351, 219, 283, 284; 379/406.01, 406.02, 406.03, 406.04, 406.05, 406.06, 406.07, 406.08, 406.09, 406.1, 406.11, 406.12, 406.13, 406.14, 406.15, 406.16

(56) References Cited

U.S. PATENT DOCUMENTS 5,995,566 A * 11/1999 Rickard et al. ............. 375/346
6,236,726 B1 * 5/2001 Darveau ..................... 379/417
6,389,062 B1 * 5/2002 Wu ............................ 375/222

* cited by examiner

Primary Examiner—Young T. Tse
Assistant Examiner—Sam K. Ahn
(74) Attorney, Agent, or Firm—Shapiro Cohen; Dennis R. Haszko

(57) ABSTRACT

A method and apparatus for interference cancellation in a high-speed modem that includes a first coupler for receiving a differential signal including a received data signal, a second coupler for deriving a common mode signal for the transmitted signal, and a phase-shift circuit coupled to the second coupler for deriving orthogonal signals from the common mode signal. First and second multipliers mix the orthogonal signals with the received signal. First, second, and third integrators integrate the mixed orthogonal signals and the common mode signal to produce orthogonal signal level measurements ITONE and QTONE and a common mode signal level measurement CMTONE, respectively. A controller derives orthogonal correction signals from measurements by dividing ITONE and QTONE respectively by CMTONE and multiplying by an appropriate constant. This output is then used to increment or decrement the signals to the respective digital to analog converters, DACI and DACQ. Multipliers combine these orthogonal correction signals to the orthogonal signals. An adder the combines the corrected orthogonal signals with the received signal for deriving the received data signal by cancelling interference therein.

14 Claims, 1 Drawing Sheet

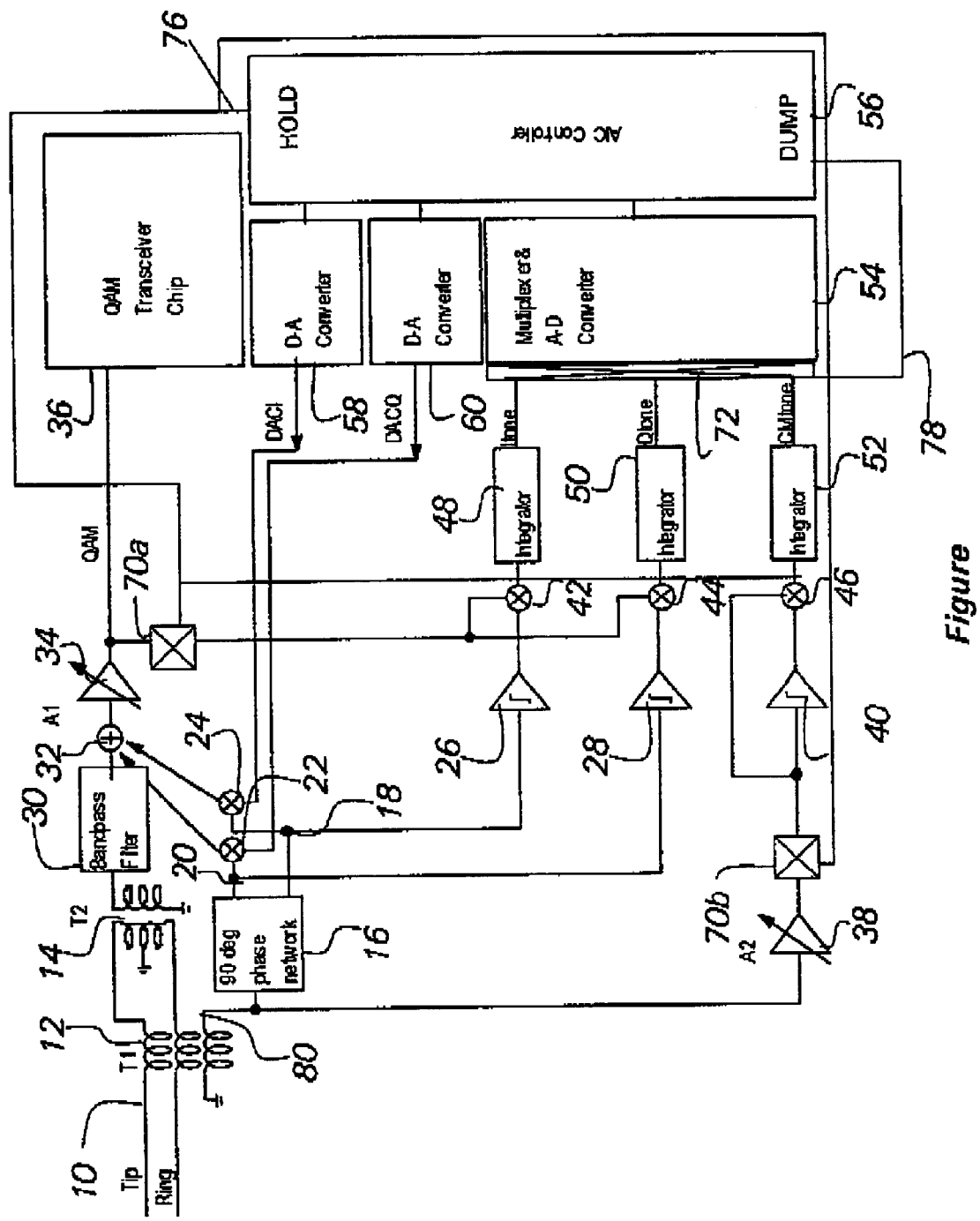
Figure

METHOD AND APPARATUS FOR INTERFERENCE CANCELLATION IN A HIGH SPEED MODEM

FIELD OF THE INVENTION

The present invention relates to title and is particularly concerned with method and apparatus for interference cancellation in a high-speed modem.

BACKGROUND OF THE INVENTION

In a modem designed to receive high-speed data over a physical facility such as a copper pair, ingress of radio signals is a problem, particularly when these radio signals are within or close to the spectrum occupied by the data signal being received by the modem.

A radio signal induces a longitudinal (common-mode) voltage and current on the facility. In the case of a balanced metallic pair, the legitimate signal appears as a differential voltage and current. Ideally, the receiver would not respond to the common-mode signal, and no interference would result. In practice, small asymmetries in the balanced pair cause some transfer of common-mode signal to differential mode. The modem itself may also introduce such imbalance, and in addition the receiver may not entirely reject common-mode signals. The result is that the receiver sees an interfering signal voltage which may be of the order of 10 percent of the common-mode voltage.

An analogous situation occurs in coaxial cable, in which an induced sheath current creates a signal that appears between the center conductor and the sheath.

All of the following techniques are effective, but have certain limitations. In general, Automatic Interference Cancellation, including the version which is the subject of this invention, would be used in combination with these existing techniques:

i) It is possible to reduce the effect of physical asymmetry by using a common-mode choke at the receiver input.

ii) Since a radio signal usually occupies a narrow spectrum compared to the data signal, it is possible to use narrow-band digital and/or analog notch filters to reject the interfering signal Such a filter, if implemented digitally, will introduce a finite but acceptable degradation of the received signal. However, it is ineffective against interfering signals of sufficient amplitude to overload the receiver's A-D converter or other circuits. An analog filter can prevent such overload, but typically degrades the signal more unless a complex and expensive filter is used. It is also more difficult to make an analog filter adaptive in order to deal with signals appearing at unpredictable frequencies.

iii) A modem using discrete multi-tone modulation can deal with interfering signals of moderate amplitude by simply not using the affected channels. However, it is still vulnerable to overloading by strong interfering signals.

SUMMARY OF THE INVENTION

An object of the present invention is to provide an improved method and apparatus for interference cancellation in a high-speed modem.

The present invention takes advantage of the fact that the interfering signal as it appears in the receiver is always a replica of the common-mode signal appearing on the facility, but differs from it in magnitude and phase. Therefore, if we take the common-mode signal and apply the appropriate attenuation and phase shift, we can create a signal equal in amplitude and opposite in phase to the signal as it appears in the receiver, and use this to cancel the interfering signal. This operation is simplified if the interfering signal is narrow-band, since the required attenuation and phase shift will the be nearly the same for all components of the interfering signal.

In accordance with an aspect of the present invention there is provided a method of interference cancellation in a high-speed modem comprising the steps of, responsive to a transmitted signal receiving a differential signal including a received data signal and deriving a common mode signal, deriving orthogonal signals form the common mode signal, deriving orthogonal correction signals in dependence upon the received data signal, orthogonal signals and the common mode signal, multiplying respective orthogonal signals to the differential signal to obtain the received data signal by cancelling interference therein.

In accordance with another aspect of the present invention there is provided apparatus for interference cancellation in a high-speed modem comprising a first coupler for receiving a differential signal including a received data signal in response to a transmitted signal; a second coupler for deriving a common mode signal from the transmitted signal; a phase-shift circuit coupled to the second coupler for deriving orthogonal signals from the common mode signal; first and second multipliers for mixing the orthogonal signals with the received signal; first, second, and third integrators for integrating the mixed orthogonal signals and the common mode signal to produce orthogonal signal level measurement and a common mode signal level measurement, respectively; a controller for deriving orthogonal correction signals from measurements; multipliers for applying the correction signals to the orthogonal signals; and an adder for combining the orthogonal correction signals with the differential signal for cancelling interference therein and deriving the received data signal.

Advantages of the present invention include rapid response to interfering signals such as amateur radio signals.

BRIEF DESCRIPTION OF THE DRAWINGS

The present invention will be further understood from the following detailed description, with reference to the drawings in which:

The FIGURE illustrates, in a block diagram, an interference cancellation circuit in accordance with an embodiment of the present invention.

DETAILED DESCRIPTION

Referring to the FIGURE, there is illustrated in a block diagram an interference cancellation circuit in accordance with an embodiment of the present invention. The interference cancellation circuit includes inputs 10 for tip and ring connections coupled to a transformer 12 and a transformer 14. A ninety degree phase shift circuit 16 is connected to the secondary of transformer 12 and has outputs 18 and 20. The outputs 18 and 20 are connected to multipliers 22 and 24, respectively, and to limiting amplifiers 26 and 28, respectively. A band pass filter 30 is coupled to the secondary of transformer 14. Output from the band pass filter 30 is connected to a summing point 32. Outputs from multipliers 22 and 24 are also connected to the summing point 32. The output of summing circuit 32 is applied as input to an automatic gain controlled amplifier 34 the output of which is applied as input to a quadrature amplitude modulation (QAM transceiver 36. The secondary of transformer 12 is also connected to a second automatic gain controlled amplifier 38. Output from the amplifier 38 is applied as input to a limiting amplifier 40. Limiting amplifiers 26, 28 and 40 are connected to multipliers 42, 44 and 46, respectively, followed by integrators 48, 50 and 52. Outputs of integrators 48, 50 and 52 are applied as inputs to a multiplexer and multiplexing analog to digital converter (MUX/ADC) 54. The output of MUX/ADC 54 is input to a controller 56. Outputs of controller 56 are input to digital to analog converters (DACs) 58 and 60, and are connected in turn to multipliers 22 and 24, respectively. The output of amplifier 34 is also applied to multipliers 42 and 44. Similarly, the output of the second amplifier 38 is applied to the multiplier 46. The controller 56 is connected to two sets of switches 70a, 70b, and 72, one set of switches 70a and 70b via HOLD line 76 and the other set of switches 72 via a DUMP line 78.

In operation, in the embodiment of the FIGURE, cancellation of the interference is achieved by taking the common-mode signal as it appears at the secondary of transformer 12, and passing it through the ninety degree phase shift circuit 16, thus splitting it into two components at ninety degrees to each other, on outputs 18 and 20, respectively. These components are labelled as being on I and Q axes. In general, the phase shift network 16 inserts an overall frequency-dependent phase shift, hence the I and Q axes do not have any particular relationship to the original signal, but are always mutually orthogonal. These I and Q signals are then passed via multipliers 22 and 24 to the summing point 32, where they are combined with the original signal. Each multiplier effectively multiplies each I or Q signal by a DC voltage created by the DACs 58 and 60 (the DACI and DACQ signals, respectively). By applying the appropriate voltage to each multiplier, a correction signal of any amplitude over a suitable range and any phase can be applied to the summing point 32.

The present embodiment of the invention is concerned with the arrangement used to control the correction signal in an optimum manner in the residential very high bit rate digital subscriber line (VDSL) environment.

In this environment, the strongest interfering signal is likely to be that of a nearby amateur radio station. These transmitters are not powerful compared to those used for commercial broadcast, but are typically located much closer to the data transmission facility, particularly the drop wire. They transmit at irregular intervals, and the operators are permitted to change frequency and mode of operation at will within certain pre-assigned bands. Therefore, to be fully effective, an advanced interactive content (AIC) system must adapt very rapidly when an ingress signal appears.

It is difficult to devise a VDSL frequency plan that avoids the amateur bands. For example, a trial system could use the spectrum from 5.15 to 9.15 MHz, and thus include the forty meter amateur band from 7 to 7.3 MHz.

Within this band, the bandwidth of the signal is limited by law to six kHz. In practice, most operators use the single-sideband mode, occupying a bandwidth of about three kHz. This constrains the risetime to one hundred microseconds or more, and in practice slower risetimes may be common. Ideally, then, our system should adapt to the ingress signal as it rises, so no data is lost. Failing this, it must adapt quickly enough that the resulting error burst can be handled by the modem's error correction system. Once adapted, the system should retain its setting so adaptation is not lost in the intervals between transmissions, or during pauses (a single-sideband signal is simply a frequency-shifted copy of the operator's voice, so it falls to zero during pauses).

Rapid adaptation is made difficult by the fact that the interfering signal must be measured in some way in order to control the adaptation process. This measurement is in fact difficult to make because of the simultaneous presence of the data signal that may in general be as strong as or stronger than the interfering signal. The data signal actually appears as noise superimposed on the measurement.

Even if a measurement of the amplitude can be obtained, it gives no indication of the direction or magnitude of the required change to the DACI and DACQ signals. A time-consuming blind search is necessary.

The present embodiment of the invention takes advantage of the fact that the interfering signal can be correlated with the common-mode signal, which is readily available. By correlating the composite signal at the QAM point, output of amplifier 34 in the FIGURE, with the I and Q components of the common-mode signal using multipliers 42 and 44 as correlators, and integrating the results, direct current (DC) voltages ITONE and QTONE are produced that are directly proportional to the I and Q components at the QAM point. The data signal appears as noise on these measurements, but always averages to zero in the long run. If, in addition, the amplitude of the common-mode signal (CMTONE) is measured at the same time using the limiting amplifier 40, the multiplier 46 and the integrator 52, the necessary correction to DACI and DACQ can in principle be computed directly and perfect cancellation can be achieved in one iteration. In practice, all measurements will contain errors from a number of sources, but the system can still be designed to converge to a suitable degree in the required time.

Referring to the FIGURE, the I and Q reference signals from outputs 18 and 20 are passed through limiting amplifiers 26 and 28 before being applied to multipliers 42 and 44. This produces constant-amplitude square waves at the multiplier inputs, thus creating a constant gain factor between the signal at the QAM point and the multiplier output. The limiting action also tends to reduce the effect of other incidental common-mode signals that may be present. The resulting harmonic response is not harmful because harmonics of the interfering signal lie outside the band of the analog filter.

The common-mode signal (CMTONE) is measured by correlation with an amplitude-limited version of itself at the multiplier 46, the resulting performance is equivalent to a nearly ideal full-wave rectifier. The integrator 52 is identical to those in the I and Q channels, so tracking is achieved for both steady-state and varying amplitudes.

The gain of the amplifier 34 is controlled by the transceiver chip for automatic gain control (AGC) purposes. Since the signal amplitude is essentially constant at its output, it is convenient to perform our measurements here. However, the gain variation between the summing point 32 and the measurement point must somehow be taken into account if the proper correction is to be computed. This is accomplished by passing the common-mode signal through an identical amplifier 38 that is controlled by the same AGC voltage.

The integrators 48, 50 and 52 are designed for optimum performance over a period of the order of 10 microseconds, which is about optimum if the interfering signal is large compared to the data signal. As the interfering signal gets smaller, due to low amplitude of the interfering signal or because partial adaptation has been achieved, the relative uncertainty in the readings gets larger. The controller firmware deals with this by accumulating individual readings; it is well known that the signal to uncertainty ratio improves with the square root of the number of readings. The firmware is designed to achieve an optimal balance between speed and accuracy at each step in the iteration.

The firmware is also arranged to deal with overload by very large signals, which could otherwise lead to inappropriate control loop response, including instability. In addition, it avoids making corrections in the absence of an interfering signal so that noise will not cause the system to wander away from the correct setting.

A filter may be included in the common-mode path at point 80 to improve performance in specific bands by providing a cleaner signal for correlation. This compromises or precludes operation at other frequencies.

In operation, to facilitate reading of the integrators 48, 50 and 52, and to ensure that all integrators operate over the same period even though their outputs cannot be read into the controller simultaneously, analog switches 70a, 70b, and 72 are provided. One set of switches 70a and 70b blocks the signals from the variable-gain amplifiers into the multipliers 42, 44, and 46, causing the integrators to hold their current values. These switches 70a and 70b are activated when the HOLD line 76 is driven high by the controller 56. The other set of switches 72 is arranged to zero the integrators when the DUMP line 78 is driven high by the controller 56. To perform a set of measurements, the DUMP line 78 is driven high to zero the integrators, then driven low to start the integration. The HOLD line 76 is held low during the integration. At the end of the integration period, which is typically of the order of 10 microseconds, the controller 56 drives the HOLD line 76 high to freeze the integrator outputs, and then reads the integrators sequentially using MUX/ADC 54. There is some integrator leakage, which results in the three readings being low by different, but predictable, factors. This is allowed for in the firmware code.

Offset is present in the multipliers, integrators, and associated circuitry. This offset is measured by performing integrations with the input signal blocked by holding the HOLD line 76 high during the integration time. The result is stored and subtracted from subsequent measurements. Offset varies slowly with time, mainly because of temperature change, so is measured approximately every 100 milliseconds.

To compute the correction to be applied on the Q axis (for instance), it is necessary to divide the QTONE reading by the CMTONE reading, then to multiply by an appropriate constant, the required value of which is determined by the gains of the multipliers, integrators, and associated circuitry. The controller 56 has a built-in fast multiplier, but no divide capability. Division is therefore accomplished by reading a lookup table. The value at each address is proportional to the inverse of the address. The table entries for very high and very low values of CMTONE are modified to minimize the effects of compression and quantization errors, respectively. The I axis is handled in a similar manner. Detail of an implementation of the present invention is provided in commented code in Appendices I and II which accompany this disclosure on CD-ROM Duplicate copies of the CD-ROM include an MS-Word™ document of nineteen pages in length with a file on each named "appendix 1.doc" and herein incorporated by reference.

While the present embodiment of the invention has been described in the context a twisted-pair transmission facility, a person of ordinary skill in the art will recognize that the correction circuit described is also applicable to other facilities, for example co-axial cable transmission, in which sheath current is equivalent to common mode current in the present embodiment. Also, the present embodiment illustrates the use of transformer for coupling to the transmission facility, however any suitable coupler could be substituted.

While a particular embodiment of the present invention has been described in detail, it should be appreciated that numerous modifications, variations, and adaptations may be made thereto without departing from the scope of the invention as defined in the claims.

COMPUTER PROGRAM LISTING

The present invention herein incorporates by reference the CD-ROM and a duplicate CD-ROM thereof including the MS-Word™ document of nineteen pages in length, 73 km in size with a filename "appendix 1.doc" and each created on Dec. 30, 2002.

APPENDIX I

```
_divide_section    CODE
;
;divide.asm -    table divide function in assembly, also
;                big_enough( ) function that decides if itone
;                and qtone are big enough to do something about.
;
;
; -------------------- EQUATES ----------------------;
ICONST             equ    0x08    ; gain constant for itone
QCONST             equ    0x09    ; gain constant for qtone
CM_THRESH_PER      equ    4       ; cmtone threshold value (per
                                  ; integration)
DIVIDE_ADDRL       equ    0x20    ; specify start of DIVIDE table in RAM
                                  ; (bank 1)
                                  ; (*change if memory map changes*)
THRESH_ADDR        equ    0xA0    ; specify start of threshold table in
                                  ; RAM (bank 0)
                                  ; (*change if memory map changes*)
PASS_ADDR          equ    0xA9    ; specify start of pass table in RAM
                                  ; RAM (bank 0)
                                  ; (*change if memory map changes*)
;PIC17C44 register definitions
INDF0              equ    0x00
FSR0               equ    0x01
```

APPENDIX I-continued

```
ALUSTA      equ     0x04
WREG        equ     0x0A
PRODL       equ     0x18
PRODH       equ     0x19
;---------------External variables and labels--------------;
        EXTERN itone            ; allow assembly to read/write C
        EXTERN qtone            ; variables
        EXTERN cmtone
        EXTERN new_iout
        EXTERN new_qout
        EXTERN iteration
        EXTERN temp1
        EXTERN temp2
        GLOBAL big_enough  ; enable functions to be called
                           ; from C functions
        GLOBAL divide
;--------------- divide ( ) function ------------------------;
; calculates correction values based on itone, qtone, cmtone and
; contants ICONST, QCONST. Does signed 8-bit hardware multiplies.
divide          bcf ALUSTA, 0           ; clear carry bit
                rrcf cmtone, 0          ; right shift cmtone 1, store in
                                        ; WREG
                movlr 0x1               ; switch to gpr bank 1 (bank of
                                        ; DIVIDE table)
                addlw DIVIDE_ADDRL      ; add DIVIDE table start address
                                        ; and store in WREG
                movwf FSR0              ; move divide table element
                                        ; address to indirect
                                        ; addressing reg.
                movpf INDF0, WREG       ; move table divide value to WREG
                movlr 0                 ; switch to grp bank 0
                movwf temp1             ; store table divide value
                mullw ICONST            ; multiply by ICONST
                tstfsz  PRODH           ; check for non-zero PRODH
                goto mult_overflow_i    ; PRODH non zero, overflow as
                                        ; occurred
                btfsc PRODL, 7          ; test overflow in msb of PRODL
                goto mult_overflow_i    ; overflow 0x7F to 0x80
                movfp PRODL, WREG       ; no overflow has occurred - use
                                        ; PRODL
                goto end_imult
mult_overflow_i movlw 0x7F              ; output full scale pos.
end_imult       mulwf   itone           ; multiply WREG by itone
                btfsc itone, 7          ; test sign bit
                subwf PRODH, 1          ; PRODH = PRODH - WREG (don't
                                        ; care about PRODL)
                movpf PRODH, new_iout   ; store high byte of product in
                                        ; new_iout
; now multiply for qtone
                movfp temp1, WREG       ; move table divide entry to WREG
                mullw QCONST            ; multiply by QCONST
                tstfsz  PRODH           ; check for non-zero PRODH
                goto mult_overflow_q    ; PRODH non zero, overflow as
                                        ; occurred
                btfsc PRODL, 7          ; test overflow in msb of PRODL
                goto mult_overflow_q    ; overflow 0x7F to 0x80
                movpf PRODL, WREG       ; no overflow has occurred - use
                                        ; PRODL
                goto end_qmult
mult_overflow_q movlw 0x7F              ; output full scale pos.
end_qmult       mulwf   qtone           ; muitiply result by qtone
                btfsc qtone, 7          ; test sign bit
                subwf PRODH,1           ; PRODH = PRODH - WREG (don't
                                        ; care about PRODL)
                movpf PRODH, new_qout   ; store high byte of product in
                                        ; new_qout
                return                  ; return from subroutine
;--------------- big_enough ( ) function ------------------------;
; function big_enough ( ) - compare itone and qtone to threshold table
to see if either big enough
; to start correcting. Modifies temp1 to give result: temp1 = 0 -
not big enough, 1 = big enough
big_enough movfp  iteration,WREG       ; move iteration value to WREG
                  addlw THRESH_ADDR    ; add threshold table start
                                       ; address and store in WREG
                  movwf FSR0           ; move threshold table element
                                       ; address to indirect addressing
                                       ; reg.
                  movpf INDF0, temp2   ; move table threshold value to
```

APPENDIX I-continued

```
                    movfp itone, WREG        ; temp2
                    btfss WREG,7             ; move itone to WREG
                                             ; test msb of itone to test pos
                                             ; or neg
                    goto pos_itone           ; if pos itone, don't negate
                                             ; (complement and add one)
                    comf WREG,1              ; complement itone in WREG
                    addlw 0x1                ; add one to WREG - neg itone is
                                             ; now pos itone in WREG
pos_itone           cpfsgt temp2             ; skip next if abs(itone) >
                                             ; threshold [iteration]
                    goto cmtone_check        ; itone is big enough - check
                                             ; cmtone
qtone_cmp           movfp   qtone, WREG      ; move qtone to WREG
                    btfss WREG, 7            ; test msb of qtone to test pos
                                             ; or neg
                    goto pos_qtone           ; if pos qtone, don't negate
                                             ; (complement and add one)
                    comf WREG, 1             ; complemented itone in WREG
                    addlw 0x1                ; add one to WREG - neg qtone is
                                             ; now pos qtone in WREG
pos_qtone           cpfslt temp2             ; skip next if abs(qtone) >
                                             ; (threshold[iteration] return
                                             ; both itone and qtone not big
                                             ; enough - return
                                             ; qtone is big enough - check
                                             ; cmtone (
cmtone_check        movfp iteration, WREG    ; move iteration to WREG
                    addlw PASS_ADDR          ; add pass table start address
                                             ; and store in WREG
                    movwf FSR0               ; move pass table element address
                                             ; to indirect addressing reg.
                    movpf INDF0, WREG        ; move table pass value to WREG
                    mullw CM_THRESH_PER      ; multiply pass table value with
                                             ; cmtone threshold constant
                    tstfsz   PRODH           ; check for overflow into PRODH
                    goto   nzero_prodh       ; overflow - threshold must be
                                             ; bigger than cmtone - don't
                                             ; calculate
                    movfp cmtone, WREG       ; move cmtone to WREG
                    cpfsgt   PRODL           ; don't do anything (leave temp1 =
                                             ; 0) if CM_THRESH_PER per
                                             ; integration > cmtone
                    bsf    temp1, 0          ; templ = 1 if prodh = 0 and
                                             ;cmtone > PRODL
                                             ;nzero_prodh     return
                    end
```

Appendix II

```
//****************************************************************
//
// This is the main source file for the AIC code. All code except
// fast assembly functions is in this file.
//
// File Name: AIC.C
//
//
//****************************************************************
// Include files
//
#include <P17C44.H>     // P17C44 processor defines (registers, bits,etc.)
#include "AIC.H"        // This include file contains the function
                        // prototypes
#include <STDDEF.H>     // include bit definition prototypes and other
                        // variable types
#include <DELAYS.H>     // include delay function prototypes
#include <INT16.H>      // include interrupt function prototypes
//****************************************************************
//
// Preprocessor macro definitions
#define Device_CLK   16000000 // Device Oscillator is 16 MHz
//****************************************************************
//
```

-continued

Appendix II

```
// Declare global variables here.
#pragma         udata LOW_GPR0      // uninitialized RAM, low part of GPR0
                                    // bank
unsigned char   ichange, qchange, iout, qout, new_iout, new_qout;
                                    // dac parameters
unsigned char   qtone,itone,cmtone,cmabs;
                                    // a/d read values
unsigned char   i_offset,q_offset,cm_offset;
                                    // offset calibration values
int             i_temp,q_temp,cm_temp;
                                    // offset accumulators (16 bit)
unsigned int    offset_timer;       // offset timer (16 bit)
unsigned char   offset_flag,offset_count;
                                    // offset flags and counters
unsigned char   iteration,little_it,aic_off;
unsigned char   temp1, temp2, temp3; // interrupt temporaries
#pragma idata HIGH_GPR0 = 0x0A0
                                    // initialized RAM, high part of GPR0 bank
unsigned char   threshold[THRESHNUM] =
                {10,14,20,28,33,40,48,54,61};
unsigned char   pass[THRESHNUM] = {1,2,4,7,11,16,22,29,37};
//unsigned char threshold[THRESHNUM] =
//              {10,14,20,28,33,40,48,54,61,68,75,82,89,96,103,110};
// threshold table (in RAM to allow debug/testing modification)
//unsigned char pass[THRESHNUM] =
//              {1,2,4,7,11,16,22,29,37,46,56,67,79,92,106,121};
// number of integrations corresponding to threshold table
#pragma idata LOW_GPR1 = 0x0120
                                    // initialized RAM, low part of GPR1 bank
unsigned char DIVIDE[128]
={102,102,102,85,64,51,42,36,32,28,25,23,21,19,18,17,16,15,14,13,12,
12,11,11,10,10,9,9,9,8,8,8,8,7,7,7,7,6,6,6,6,6,6,5,5,5,5,5,5,5,5,
4,4,4,4,4,4,4,4,4,4,4,4,3,3,3,3,3,3,3,3,3,3,3,3,3,3,3,3,3,3,3,3,
2,2,2,2,2,2,2,2,2,2,2,2,2,2,2,2,2,1,1,1,1,1,1,1,0,0,0,0,0,0,0,0,
0,0,0,0,0,0,0};
#pragma code PROG               // program code ROM
//********************************************************************
//
// __STARTUP() function.
// This function executes before the main() function. All startup
// initialization is done here
void __STARTUP(void)
{
        DDRB = 0x10;            // set port B all output (LED's) except
                                // RB4 as input for algorithm reset
        PORTB = 0x0C;           // initially : LED's off, Hold high,
                                // Dump high
        DDRC = 0;               // set port C all output
        PORTC = 0;              // zero DAC's
        DDRE = 0;               // set port E all output (D/A latch
                                // enables)
        PORTE = 0;              // set D/A latch enables to 0
        PORTEbits.RE0 = 1;      // latch enable DACA
        PORTEbits.RE0 = 0;
        PORTEbits.RE1 = 1;      // latch enable DACB
        PORTEbits.RE1 = 0;
        DDRC = 0xFF;            // set port C as all input
        DDRD = 0x80;            // set port D pins 7 as input, rest
                                // output
        PORTDbits.RD2 = 0;      // set S0 to 0
        PORTDbits.RD3 = 0;      // set S1 to 0
        PORTDbits.RD4 = 01;     // set CS- to 1        PORTD is 0x70
                                // at start, ready for itone read
        PORTDbits.RD5 = 1;      // set RD- to 1
        PORTDbits.RD6 = 1;      // set S-/H to 1
        INTSTAbits.PEIE = 1;    // set periferal interrupt enable bit
        PIEbits.TMR3IE = 1;     // enable timer3 interrupt enable
}
//********************************************************************
//
// reset_iteration() function.
// This function starts a new iteration of itone, qtone, and cmtone
// integrations.
// This function is called after a change is made to the DACs or if
// the end of the threshold table has been reached and the threshold
// was never reached.
void reset_iteration(void)
```

Appendix II

```
{
        little_it = 0;
        iteration = 0;
        itone = 0;
        qtone = 0;
        cmtone = 0;
}
//*********************************************************************
//
// reset_timer() function.
// This function restarts the timer for the integration period,
// manipulating the hold and dump lines on the integrators of itone,
// qtone and cmtone.
void reset_timer(void)
{
        if (offset_flag) {
                PORTBbits.RB2 = 1;      // drive hold high to measure a/d
                                        // offsets
        }else{
                PORTBbits.RB2 = 0;      // drive hold low for normal
                                        // operation
        }
        PORTBbits.RB3 = 1;      // drive dump high
        TMR3L = 0;              // clear timer 3
        TMR3H = 0;
        PR3L = TMR3PERL;        // set timer 3 period register to
                                // integration period
        PR3H = TMR3PERH;
        TCON2bits.TMR3ON = 1;   // start timer 3
        PORTBbits.RB3 = 0; // drive dump low (start integration)
}
//*********************************************************************
//
// reset_offset() function.
// This function initializes all offset related variables and flags
// the code to perform an offset calibration the next time the
// integration timer expires
void reset_offset (void)
{
        PORTBbits.RB7 = 1;              // turn on LED to show offset
calibration mode
        i_temp = 0;
        q_temp = 0;                     // initialize counters
        cm_temp = 0;
        offset_flag = DO_OFFSET;        // flag do offset calibration
                                        // next timer 3 interrupt
        offset_count = OFFSET_NUM;// set number of offset
                                        // iterations to perform
}
//*********************************************************************
//
// PIV interrupt handler
// This function is executed when timer 3 (the integration timer)
// expires.
// It manipulates the control lines of the ADC mux chip (through
// PORTD) and reads the values of itone, qtone and cmtone (through
// PORTC).
//
// If in offset calibration mode, it sums
// the offset values in the itone, qtone and cmtone channels. When
// the summation is complete, it calculates the average offset values
// for each channel.
//
// If in normal operation mode, it sums itone, qtone and cmtone until
// it decides that the values are big enough (ie. a tone is present)
// at which time it calculates the change to make to the DAC values.
// If the values don't get big enough before the end of the threshold
// table, it resets the machine and starts again at the start
// of the threshold table. This gives the effect of a longer
// integration time with smart threshold checking to distinguish
// noise.
void _PIV(void)
{
        CPUSTAbits.GLINTD = 1;  // Disable interrupts
        TCON2bits.TMR3ON = 0;   // stop timer 3
        if (offset_flag){       // if in offset calibration mode
                PORTDbits.RD4 = 0;      // drive CS- low
```

Appendix II

```
        PORTDbits.RD6 = 0;          // drive S-/H low
        PIRbits.TMR3IF = 0;         // clear interrupt flag
        while(PORTDbits.RD7);       // wait for INT to go low
        if (PORTC & 0x80){          // test sign bit of PORTC
            i_temp += (PORTC + 0xFF00);   // neg PORTC, pad
                                          // high byte with FF
        }else{
            i_temp += PORTC;        // pos PORTC, normal add
        }
        PORTD = 0x74;               // set bits high for next
                                    // read, select qtone from mux
        PORTDbits.RD4 = 0;          // drive CS- low
        PORTDbits.RD6 = 0;          // drive S-/H low
        while(PORTDbits.RD7);       // wait for INT to go low
        if (PORTC & 0x80){          // test sign bit of PORTC
            q_temp += (PORTC + 0xFF00);   // neg PORTC, pad
                                          // high byte with FF
        }else{
            q_temp += PORTC;        // pos PORTC, normal add
        {
        PORTD = 0x78;               // set bits high for next
                                    // read, select cmtone from mux
        PORTDbits.RD4 = 0;          // drive CS- low
        PORTDbits.RD6 = 0;          // drive S-/H low
        while(PORTDbits.RD7);       // wait for INT to go low
        if (PORTC & 0x80){          // test sign bit of PORTC
            cm_temp += (PORTC + 0xFF00);  // neg PORTC, pad
                                          // high byte with FF
        }else{
            cm_temp += PORTC;       // pos PORTC, normal add
        }
        PORTD = 0x70;               // select itone, drive bits high
                                    // for next time
        offset_count--;             // decrement offset counter
        if (!offset_count){         // have we done enough
                                    // iterations?
            i_offset = i_temp/OFFSET_NUM;
            q_offset = q_temp/OFFSET_NUM;     // calculate
                                              // average offset values
            cm_offset = cm_temp/OFFSET_NUM + 0x80;
            // convert cm_offset from signed to unsigned char
            offset_timer OFFSET_TIME;   // reset offset_timer
            offset_flag = 0;        // flag normal operation
            reset_iteration();      // restart fresh
                    // integrations of itone, qtone, cmtone
            PORTBbits.RB7 = 0;      // turn off LED to show end
                                    // of offset calibration mode
        }
    }else{                          // normal AIC operation
        PORTBbits.RB2 = 1;          // drive hold high (stop
                                    // integration)
        PORTDbits.RD4 = 0;          // drive CS- low
        PORTDbits.RD6 = 0;          // drive S-/H low
        offset_timer--;             // decrement offset "timer"
        while(PORTDbits.RD7);       // wait for INT to go low
        temp1 = PORTC;              // read port C (itone)
        PORTD = 0x74;               // set bits high for next
                                    // read, select qtone from mux
        PORTDbits.RD4 = 0;          // drive CS- low
        PORTDbits.RD6 = 0;          // drive S-/H low
        PIRbits.TMR3IF = 0;         // clear interrupt flag
        while(PORTDbits.RD7);       // wait for INT to go low
        temp2 = PORTC;              // read port C (qtone)
        PORTD = 0x78;               // set bits high for next
                                    // read, select cmtone from mux
        PORTDbits.RD4 = 0;          // drive CS- low
        PORTDbits.RD6 = 0;          // drive S-/H low
        while(PORTDbits.RD7);       // wait for INT to go low
        temp3 = PORTC;              // read port C (cmtone)
        temp3 += 0x80;              // convert cmtone from signed to
                                    // unsigned char
        PORTD = 0x70;               // select itone, drive bits high
                                    // for next time
        if (!aic_off){              // is the aic algorithm turned
                                    // off?
            temp1 -= i_offset;      // subtract offset value
            itone += temp1;         // sum itone value
```

Appendix II

```c
            if (ALUSTAbits.OV){        // check for overflow
                if (temp1 & 0x80){
                    itone = 0x80;      // neg overflow - output
                                       // full scale neg
                }else{
                    itone = 0x7F;      // pos overflow - output
                                       // full scale pos
                }
            }
            temp2 -= q_offset;         // subtract offset value
            qtone += temp2;            // sum qtone value
            if (ALUSTAbits.OV){        // check for overflow
                if (temp2 & 0x80){
                    qtone = 0x80;      // neg overflow - output
                                       // full scale neg
                }else{
                    qtone = 0x7F;      // pos overflow - output
                                       // full scale pos
                }
            }
            temp3 -= cm_offset;        // subtract offset value
            temp1 = cmtone +           // sum cmtone
            temp3;
            if (ALUSTAbits.C){         // check for overflow
                                       // (carry bit) (pos)
                cmtone = 0xFF;         // pos overflow, output
                                       // full scale
            }else{
                if ((temp3 & 0x80) && !(cmtone & 0x80) &&
(temp1 & 0x80)){                       // check for overflow (neg)
                    cmtone = 0x00;     // neg overflow -
                                       // output zero
                }else{
                    cmtone = temp1;    // no overflow - normal
                                       // output
                }
            }
/*          // debug start
            DDRC = 0x00;
            Nop();
            PORTC = itone;
            PORTBbits.RB0 = 1;
            PORTBbits.RB0 = 0;
            Nop();
            PORTC = qtone;
            PORTBbits.RB0 = 1;         // debug (remove for normal
                                       // operation)
            PORTBbits.RB0 = 0;         // put values out PORTC to
                                       // observe
            Nop();                     // with logic analyzer,
                                       // triggering on RB0
            PORTC = cmtone;
            PORTBbits.RB0 = 1;
            PORTBbits.RB0 = 0;
            Nop();
            PORTBbits.RB1 = 1;
            PORTC = iteration;
            PORTBbits.RB0 = 1;
            PORTBbits.RB0 = 0;
            PORTBbits.RB1 = 0;
            Nop();
            DDRC = 0xFF;
// debug end */
            temp1 = 0;
            if (++little_it >= iteration){   // only check on
            1,2,4,7,11,16,22,29,37,46,56,67,79,92,106,121 th pass
                big_enough();          // assembly routine
tests if itone or qtone are big enough - modifies temp1
                iteration++;           // increment iteration
                little_it = 0;         // reset little_it
            }
            if (temp1){                // if threshold reached
                DDRC = 0x00;           // configure port C for output
                divide();              // call assembly divide function
                                       // (calculates DAC changes in
                                       // new_iout and new_qout)
                iout += new_iout;      // change DACI value
```

Appendix II

―continued

```c
            if (ALUSTAbits.OV){   // check for overflow
                if (new_iout & 0x80){
                    iout = 0x80;  // neg overflow -
                                  // output full scale neg
                }else{
                    iout = 0x7F;  // pos overflow -
                                  // output full scale pos
                }
            }
            qout += new_qout; // change DACQ value
            if (ALUSTAbits.OV){   // check for overflow
                if (new_qout & 0x80){
                    qout = 0x80;  // neg overflow -
                                  // output full scale neg
                }else{
                    qout = 0x7F;  // pos overflow -
                                  // output full scale pos
                }
            }
            PORTC = iout;       // write itone DAC
                                // correction out port C
            PORTEbits.RE0 = 1;  // toggle latch
                                // enable for DACA
            PORTEbits.RE0 = 0;
            PORTC = qout;       // write qtone DAC
                                // correction out port C
            PORTEbits.RE1 = 1;  // toggle latch
                                // enable for DACB
            PORTEbits.RE1 = 0;
            reset_iteration();  // restart machine
            DDRC = 0xFF;        // configure port C
                                // for input
        }else{
            if (iteration >= THRESHNUM){  // if threshold
                                          // table wrap-around
                reset_iteration();  // restart machine
            }
        }
        if(!offset_timer){      // is it time to do an
                                // offset calibration?
            reset_offset();     // flag do offset
                                // calibration
        }
      }
    }
    reset_timer(); // restart the integration timer (timer 3)
    CPUSTAbits.GLINTD = 0;   // enable global interrupts
}
//*****************************************************************
//
// main() function.
// This function does some initialization and then sits in main loop.
// All background low priority tasks are done in the main loop.
// Time critical integration handling is done in PIV interrupt.
//
void main(void)
{
    Install_PIV(_PIV);      // set up peripheral interrupts
    reset_iteration();      // reset AIC algorithm
    aic_off = 0;            // initially aic algorithm is on
    iout = 0;
    qout = 0;
    i_offset = 0;           // initialize variables
    q_offset = 0;
    cm_offset = 0;
    Delay10KTCYx(START_DELAY);  // long delay to stabilize
                                // system after power up
    reset_offset();             // do offset calibration
                                // first before normal AIC
                                // operation
    reset_timer();              // start integration timer
    CPUSTAbits.GLINTD = 0;      // enable masked interrupts
        while (TRUE)
        {
            ClrWdt();           // clear watchdog timer
            if(!PORTBbits.RB4){ // if Port B pin 4 goes low
                                // (from user controlled
```

-continued

Appendix II

```
                          // switch or HC11 uP control)
            if(!aic_off){  // if not aic algorithm not
                           // already turned off
                CPUSTAbits.GLINTD = 1;   // disable masked
                                        // interrupts
                DDRC = 0;     // set port C all output
                PORTE = 0;    // set D/A latch enables to 0
                PORTC = 0;    // zero DAC's
                PORTEbits.RE0 = 1;        // latch enable DACI
                PORTEbits.RE0 = 0;
                PORTEbits.RE1 = 1;        // latch enable DACQ
                PORTEbits.RE1 = 0;
                PORTBbits.RB6 = 1;        // turn on LED to
                                          // give visual confirmation
                aic_off = 1;     // flag disable aic algorithm
                DDRC = 0xFF;     // set port C all input
                reset_timer();   // restart the integration
                                 // timer
                CPUSTAbits.GLINTD = 0;   // enable masked
                                        // interrupts
            }
        }
        if(PORTBbits.RB4 && aic_off)( // if Port B pin 4 goes
                                      // high after a low, reset
                                      // the AIC machine
            CPUSTAbits.GLINTD = 1; // disable masked interrupts
            aic_off = 0;             // flag enable aic algorithm
            PORTBbits.RB6 = 0;   // turn off LED to give
                                 // visual confirmation
            reset_iteration();       // reset AIC algorithm
            iout = 0;            // initialize local DAC values
            qout = 0;
                reset_offset(); // do offset calibration on restart
                reset_timer();      // start integration timer
                CPUSTAbits.GLINTD = 0;  // enable masked interrupts
        }
    }
}
```

What is claimed is:

1. A method of interference cancellation in a high-speed modem comprising the steps of:

responsive to a transmitted signal, receiving a differential signal including a received data signal and deriving a common mode signal;

deriving orthogonal signals from the common mode signal; and deriving orthogonal correction signals in dependence upon the received data signal, orthogonal signals and the common mode signal;

multiplying respective orthogonal signals by the orthogonal correction signals; and adding the corrected orthogonal signals to the differential to obtain the received data signal by cancelling interference therein.

2. A method as claimed in claim 1 wherein the step of deriving orthogonal correction signals includes the step of multiplying the orthogonal signals by the received data signal.

3. A method as claimed in claim 2 wherein the step of deriving orthogonal signals includes the step of, for a predetermined amount of time, integrating magnitudes of the multiplied orthogonal signals to produce signed orthogonal signal level measurements.

4. A method as claimed in claim 3 wherein the step of deriving orthogonal correction signals includes the step of multiplying the common mode signal by a limited version of the common mode signal.

5. A method as claimed in claim 4 wherein the step of deriving orthogonal signals includes the step of, for a predetermined amount of time, integrating a magnitude of the common mode signal to produce a common mode signal level measurement.

6. A method as claimed in claim 5 wherein the step of deriving orthogonal correction signals includes the comparing the orthogonal signal level measurements to predetermined threshold values.

7. A method as claimed in claim 6 wherein the step of deriving orthogonal correction signals includes the step of dividing the orthogonal signal level measurements by the common mode signal level to determine respective correction values.

8. A method as claimed in claim 7 wherein the step of dividing includes the step of first compensating for offset in the measurements.

9. A method as claimed in claim 8 wherein the step of dividing includes the step of multiplying the quotient by a constant.

10. Apparatus for interference cancellation in a high-speed modem comprising:

a first coupler for receiving a differential signal including a received data signal in response to a transmitted signal;

a second coupler for deriving a common mode signal for the transmitted signal;

a phase-shift circuit coupled to the second coupler for deriving orthogonal signals from the common mode signal;

first and second multipliers for correlating the orthogonal signals with the received data signal;

first, second, and third integrators for integrating the mixed orthogonal signals and the common mode signal to produce orthogonal signal level measurements and a common mode signal level measurement, respectively;

a controller for deriving orthogonal correction signals from measurements;

multipliers for applying the corrections signals to the orthogonal signals; and an adder for combining the corrected orthogonal signals with the differential signal for cancelling interference therein and deriving the received data signal.

11. Apparatus as claimed in claim 10 wherein the controller includes a divider for dividing the orthogonal signal level measurements by the common mode signal measurement to produce signed corrections.

12. Apparatus for interference cancellation in a high-speed modem comprising the steps of:

means, responsive to a transmitted signal, for receiving a differential signal including a received data signal and deriving a common mode signal;

means for deriving orthogonal signals from the common mode signal; and means for deriving orthogonal correction signals in dependence upon the received data signal, orthogonal signals and the common mode signal;

means for multiplying respective orthogonal signals by the orthogonal correction signals; and means for adding the combined orthogonal signals to the received data signal for cancelling interference therein.

13. Apparatus as claimed in claim 12 wherein the means for deriving orthogonal correction signals includes a correlator for correlating the orthogonal signals with the common mode signal, the correlator having outputs for correction factors for the orthogonal signals.

14. Apparatus as claimed in claim 13 wherein the means of deriving orthogonal correction signals includes a circuit for converting the correction factors into correction signals.

* * * * *